(12) United States Patent
Olomskiy

(10) Patent No.: US 9,986,054 B2
(45) Date of Patent: May 29, 2018

(54) ENHANCED PUSH NOTIFICATION FOR ALERTS

(71) Applicant: MORVEN MANAGEMENT LIMITED, Road Town, Tortola (VG)

(72) Inventor: Evgeny Vladimirovich Olomskiy, Vladivostok (RU)

(73) Assignee: MOVREN MANAGEMENT LIMITED, Road Town (VG)

( * ) Notice: Subject to any disclaimer, the term of this patent is extended or adjusted under 35 U.S.C. 154(b) by 0 days. days.

(21) Appl. No.: 14/946,426

(22) Filed: Nov. 19, 2015

(65) Prior Publication Data

US 2017/0149913 A1    May 25, 2017

(51) Int. Cl.
*H04L 29/08* (2006.01)
*H04L 12/58* (2006.01)

(52) U.S. Cl.
CPC .............. *H04L 67/26* (2013.01); *H04L 51/24* (2013.01); *H04L 67/04* (2013.01); *H04L 67/2842* (2013.01)

(58) Field of Classification Search
CPC ...... H04L 67/26; H04L 67/04; H04L 67/2842
See application file for complete search history.

(56) References Cited

U.S. PATENT DOCUMENTS

| | | |
|---|---|---|
| 5,687,216 A | 11/1997 | Svensson |
| 5,781,857 A | 7/1998 | Hwang et al. |
| 5,884,248 A * | 3/1999 | Hall ................. G08B 5/229 340/7.21 |
| 6,119,167 A * | 9/2000 | Boyle ................. H04L 12/18 709/203 |
| 6,151,491 A | 11/2000 | Farris et al. |
| 6,298,231 B1 | 10/2001 | Heinz |

(Continued)

FOREIGN PATENT DOCUMENTS

EP    1475734 A2    11/2004

OTHER PUBLICATIONS

Lee, D., "Designing the Multimedia Push Framework for Mobile Applications." International Journal of Advanced Science and Technology, vol. 32, Jul. 2011, pp. 117-124.

(Continued)

*Primary Examiner* — Chirag R Patel
(74) *Attorney, Agent, or Firm* — John W. Branch; Lowe Graham Jones PLLC

(57) ABSTRACT

Embodiments are directed towards enhanced push notifications for mobile computers. Message data and notification information may be obtained from an application server. A target client computer may be determined based on the notification information. If, the target client computer may be available on the network, a push notification message may be generated based on the notification information and the message data and communicated to the target client computer. Also, the message data may be communicated to the target client computer rather than waiting until a user to access the push notification message on the target client computer. Alternatively, if the target may unavailable on the network, the message data may be archived at the network computer enabling the message data to be communicated to the target client computer if the target client computer becomes available on the network.

26 Claims, 9 Drawing Sheets

(56) References Cited

U.S. PATENT DOCUMENTS

| | | | |
|---|---|---|---|
| 6,636,733 B1 | 10/2003 | Helferich | |
| 7,076,241 B1* | 7/2006 | Zondervan | H04L 51/063 379/100.08 |
| 7,257,583 B2 | 8/2007 | Hofmeister et al. | |
| 7,949,353 B2 | 5/2011 | Pollock et al. | |
| 8,180,382 B1 | 5/2012 | Graefen | |
| 8,200,259 B2* | 6/2012 | Kupsh | H04L 12/5835 455/412.1 |
| 2002/0123328 A1 | 9/2002 | Snip et al. | |
| 2005/0059382 A1 | 3/2005 | Brun et al. | |
| 2007/0043824 A1* | 2/2007 | Fremantle | H04L 67/26 709/214 |
| 2007/0088801 A1* | 4/2007 | Levkovitz | H04L 12/1859 709/217 |
| 2007/0260674 A1* | 11/2007 | Shenfield | G06F 17/30864 709/203 |
| 2009/0261969 A1* | 10/2009 | Kobayashi | B60R 25/102 340/539.11 |
| 2010/0162388 A1 | 6/2010 | Baugher et al. | |
| 2012/0290289 A1* | 11/2012 | Manera | G06F 17/30719 704/9 |

OTHER PUBLICATIONS

"Chat/Push notifications" quickblox.com. http://quickblox.com/developers/Chat/Push_notifications, Accessed May 11, 2015 (2 pages).

Kazwell, B. et al,, "Updated mobile apps: notifications & attachments" asana.com. https://blog.asana.com/2013/06/mobile_updates/, Jun. 13, 2013, Accessed May 11, 2015 (2 pages).

* cited by examiner

ENHANCED PUSH NOTIFICATION FOR ALERTS

TECHNICAL FIELD

The present invention relates generally messaging services, and more particular, but not exclusive, to improving the delivery of push notifications messages.

BACKGROUND

Mobile applications and/or mobile operating systems often support push-notifications that enable remote application servers to send push notification messages to mobile devices. In some cases, push notifications may include content included in a push notification message that may be displayed to a user of a mobile device. In some cases, if a push notification is provided to a mobile device the mobile device may be arranged to display an alert message corresponding to the received push notification message. The displayed alert message may be accessed by a user causing a corresponding client application (running on the mobile device) to be activated. Accordingly, if the user access a received push-notification message the client application retrieve the content that may be associated with the push-notification message. However, in some cases, the alerts may be delivered to the mobile device and them later accessed by the user when the mobile device may be disconnected from a network (e.g., offline). In such cases, the client application on the mobile device may be unable to retrieve the message content that may be associated with the alert. Thus, it is with respect to these considerations and others that the invention has been made.

DETAILED DESCRIPTION OF THE INVENTION

Figure 1:
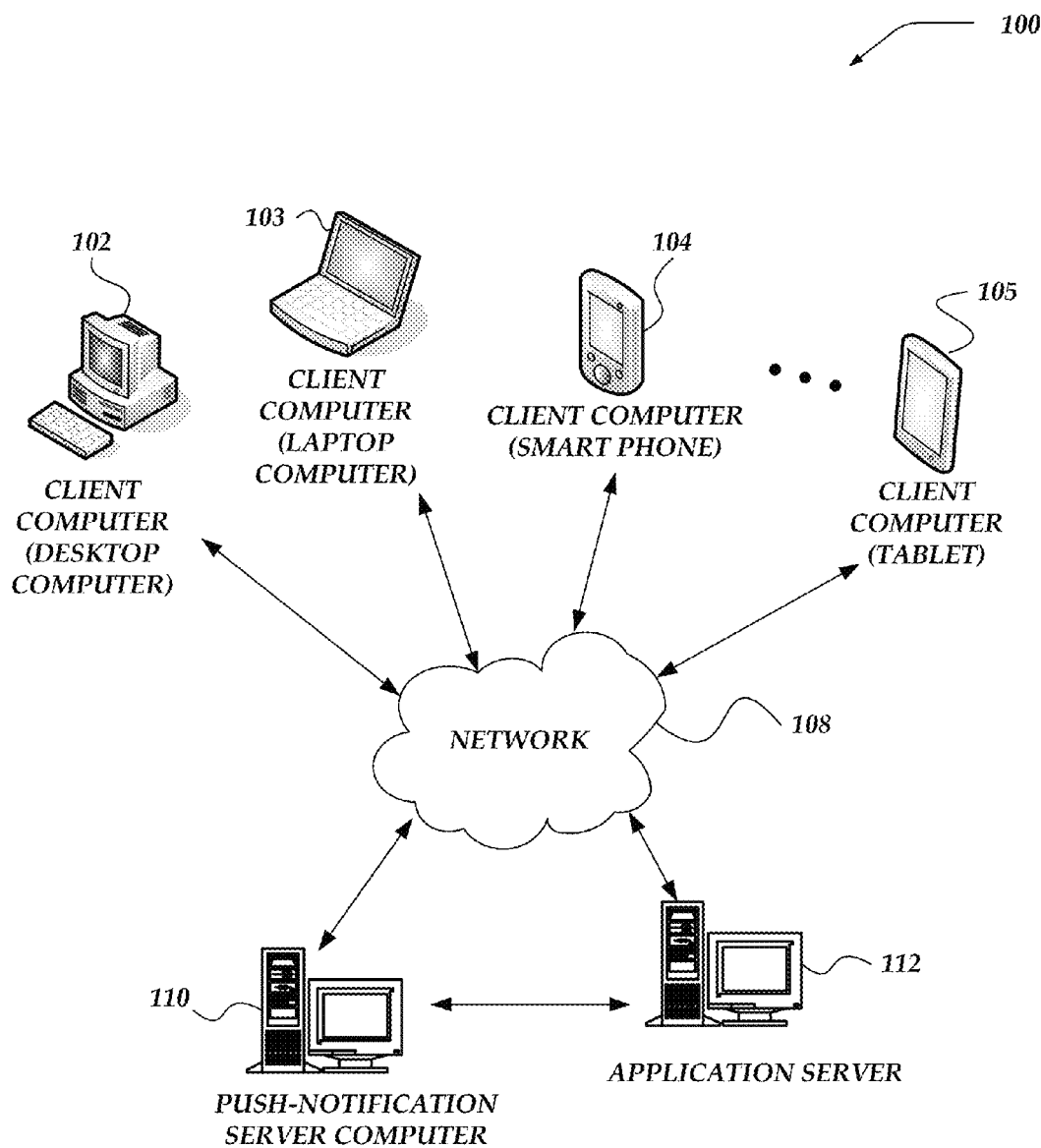
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "message," or "message data" refers to any of a variety of messaging formats, or electronic communications between computer, including but not limited to email, SMS, IM, MMS, IRC, RSS feeds, HTML, XML, SMTP, or the like. Message data may include various types of data, such as, text, audio, image, video, or the like, or combination thereof.

As used herein, the term "notification information" refers to meta-data information the may be provided by an application server to a push notification server that may be employed along with the message data to determine a target client computer/application, source client computer/application, time/date of sending or delivery, push notification platform registration information, or the like, or combination thereof.

As used herein, the terms "notification," or "alert" refer to an act by a client computer to provide information to a user. Notifications may be visual, audible, or tactile. For example, in some embodiments, notifications may be visual text and/or graphics that are displayed on the client computer. In other embodiments, notifications may be a noise alert with various beeps, tones, songs, verbal words/phrases, or other acts that a user can hear. In some other embodiments, notifications may be tactile, e.g., vibrations of the client computer or other physical acts that a user touching the client computer can feel. In various embodiments, notifications may be provided to a user in response to receipt of a message.

As used herein, the term "push notification" refers to a notification or alert delivered to a client computer by a push notification server (or other server computer). Push notifications may be a special facility that enables a client computer to receive a notification that an event (or message)

has occurred for a particular client application. Typically, push notifications for a particular client application may occur if the client application is unavailable to directly handle the event (or message). For example, if the client application is running in the background, some mobile operating systems disable the client application from most execution, including sending or receiving communications. Accordingly, in this example, a push notification may be sent to the client computer informing the user that an event (or message) associated with the client application is available. Users may access the push notification on their client computer to activate the client application that is associated with push notification so it can take further actions.

As used herein the term "push notification message" refers to a message that may be communicated to a client computer for push notifications. Push notification messages may have meta-data identifying the client application, client computers, source application, source computer, subject lines, content body, custom fields, user-interface information, action information, and so on.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards enhanced push notifications for mobile computers. In at least one of the various embodiments, message data and notification information may be obtained from an application server. In at least one of the various embodiments, a target client computer may be determined based on the notification information.

If, in at least one of the various embodiments, the target client computer may be available on the network, a push notification message may be generated based on the notification information and the message data. Accordingly, the push notification message may be communicated to the target client computer. Also, the message data may be communicated to the target client computer rather than waiting until a user to access the push notification message on the target client computer.

In some embodiments, if the message data size is less than a threshold value, the message data may be embedded in the push notification message for communicating to the target client computer.

Alternatively, if the target may unavailable on the network, the message data may be archived at the network computer enabling the message data to be communicated to the target client computer if the target client computer becomes available on the network.

In at least one of the various embodiments, the push notification message may be obtained by the target client computer. Accordingly, the target client computer may download the message data from the network computer even when the network computer may be separate from the application server that provided the message data.

In at least one of the various embodiments, if other archived message data destined for the target client computer remain undelivered on the network computer, the other archived message data may be communicated to the target client computer in the same order they were sent to the application server by a source client computer.

In at least one of the various embodiments, if the size of the message data exceeds a size limit of the push notification message, the message data may be archived at the network computer and associated with the target client computer.

Also, in at least one of the various embodiments, if the size of the message data exceeds a size limit of the push notification message, a portion of the message data may be stored in the push notification message, with the size of the stored portion determined based on the size limit of the push notification message.

Illustrated Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include push notification server computer 110, application server computer 112, client computers 102-105, and network 108.

At least one embodiment of client computers 102-105 is described in more detail below in conjunction with client computer 200 of FIG. 2. Briefly, in some embodiments, client computers 102-105 may be configured to communicate with push notification server computer 110, application server computer 112, and/or other network computers. In various embodiments, client computers 102-105 may be configured to provide messages (e.g., SMS text messages, instant messages, or the like) to other client computers and/or network computers. For example, a user may send an instant message from one client computer to another user of another client computer via a network computer.

In some embodiments, at least some of client computers 102-105 may operate over a wired and/or wireless network to communicate with one or more other client computers, computing devices, push notification server computer 110, application server computer 112, or the like. Generally, client computers 102-105 may include computing devices capable of communicating over a network to send and/or receive information, perform various online and/or offline activities, or the like. It should be recognized that embodiments described herein are not constrained by the number or type of client computers employed, and more or fewer client computers—and/or types of client computers—than what is illustrated in FIG. 1 may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but are not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, smart phones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, messaging, social networking, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of push notification server computer 110 and application server computer 112 are described in more detail below in conjunction with network computer 300 of FIG. 3. Briefly, in some embodiments, push notification server computer 110 may be arranged to communicate with client computers 102-105 to enable client application on client computers 102-105 to send and/or receive push notification messages and associated additional data. In at least one of the various embodiments, application server computer 112, may be arranged to communicate with client computers 102-105 and/or perform application specific actions for one or more server applications. Also, in at least one of the various embodiments, application server computer 112 may be arranged to communicate push notification messages, message data, or the like, to push notification server computer 110 for forwarding to one or more client computers.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including client computers 102-105, push notification server computer 110, application server computer 112, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computers 102-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), orthogonal frequency-division multiplexing (OFDM), ultra wide band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-time Transport Protocol (SIP/RTP), Short Message Service (SMS), Multimedia Messaging Service (MMS), or any of a variety of other communication protocols and/or technologies. In essence, the network may include communication technologies by which information may travel between client computers 102-105, push notification server computer 110, application server computer 112, other computing devices not illustrated, other networks, or the like.

Figure 3:
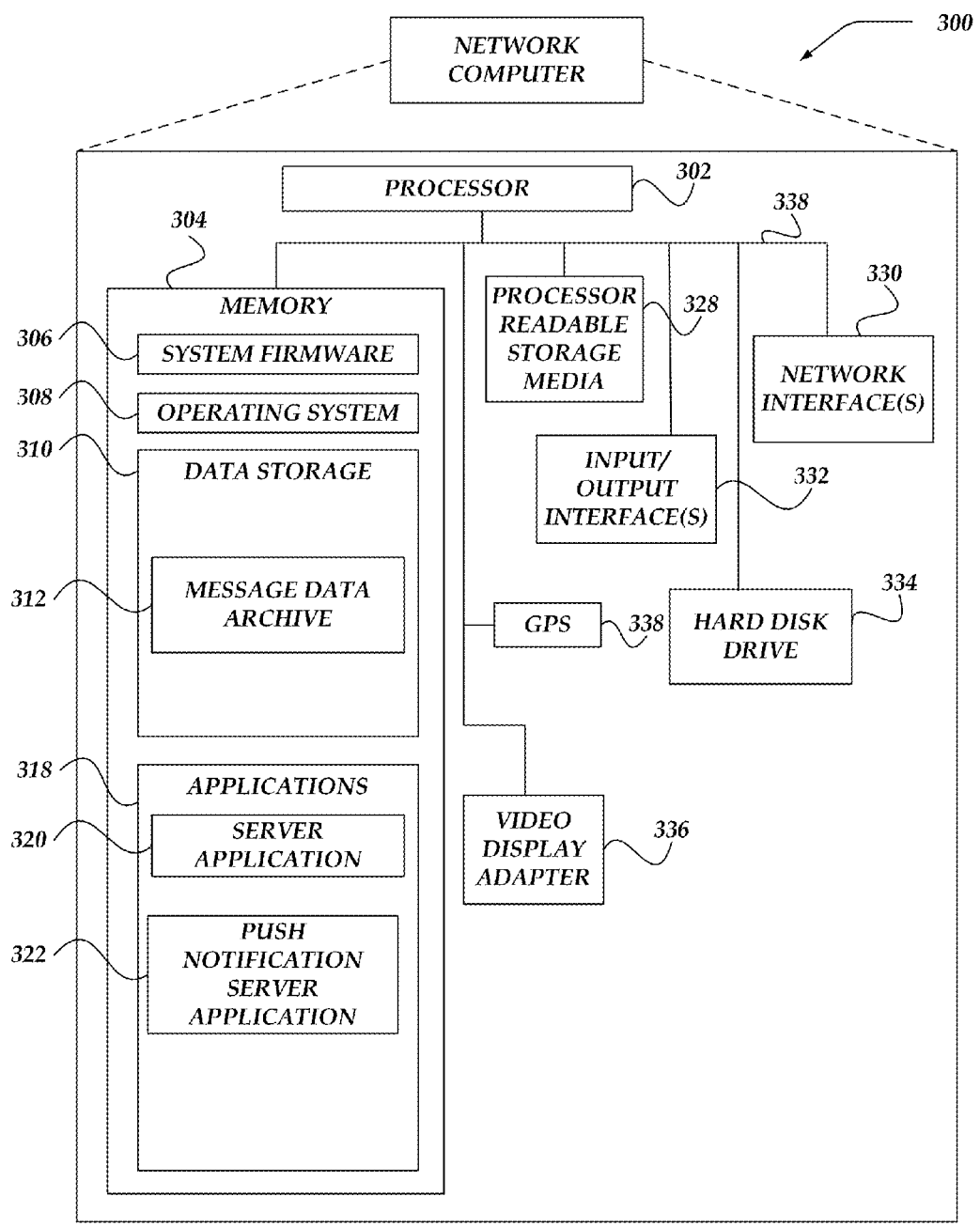
FIG. 3 shows an embodiment of a network computer that may be included in a system such as that shown in FIG. 1.

Push notification server computer 110 and/or application server computer 112 may include virtually any network computer usable to provide enhanced push notification services, such as network computer 300 of FIG. 3. In one embodiment, push notification server computer 110 may be operative to provide push notifications to client computer.

Also, push notification server computer 110 may be arranged to interface/integrate with one or more external systems such as telephony carriers, email systems, web services, or the like, to provide push notifications to client computer.

Devices that may operate as push notification server computer 110 and/or application server computer 112 include various network computers, including, but not limited to personal computers, desktop computers, multiprocessor systems, microprocessor-based or programmable consumer electronics, network PCs, server devices, network appliances, or the like. It should be noted that while both push notification server computer 110 and application server computer 112 are illustrated as a single network computer, the invention is not so limited. Thus, push notification server computer 110 and/or application server computer 112 may represent a plurality of network computers. For example, in one embodiment, push notification server computer 110 and/or application server computer 112 may be distributed over a plurality of network computers and/or implemented using cloud architecture. Likewise, in at least one of the various embodiments, a single network computer may be arranged to operate simultaneously as push notification server computer 110 and/or application server computer 112.

Moreover, push notification server computer 110 and/or application server computer 112 are not limited to a particular configuration. Thus, push notification server computer 110 and/or application server computer 112 may operate using a master/slave approach over a plurality of network computers, within a cluster, a peer-to-peer architecture, and/or any of a variety of other architectures. Thus, push notification server computer 110 and/or application server computer 112 are not to be construed as being limited to a single environment, and other configurations, and architectures are also contemplated. Push notification server computer 110 and/or application server computer 112, and/or client computer 102-105 may employ processes such as described below in conjunction with at some of the figures discussed below to perform at least some of their actions.

Illustrative Client Computer

Figure 2:
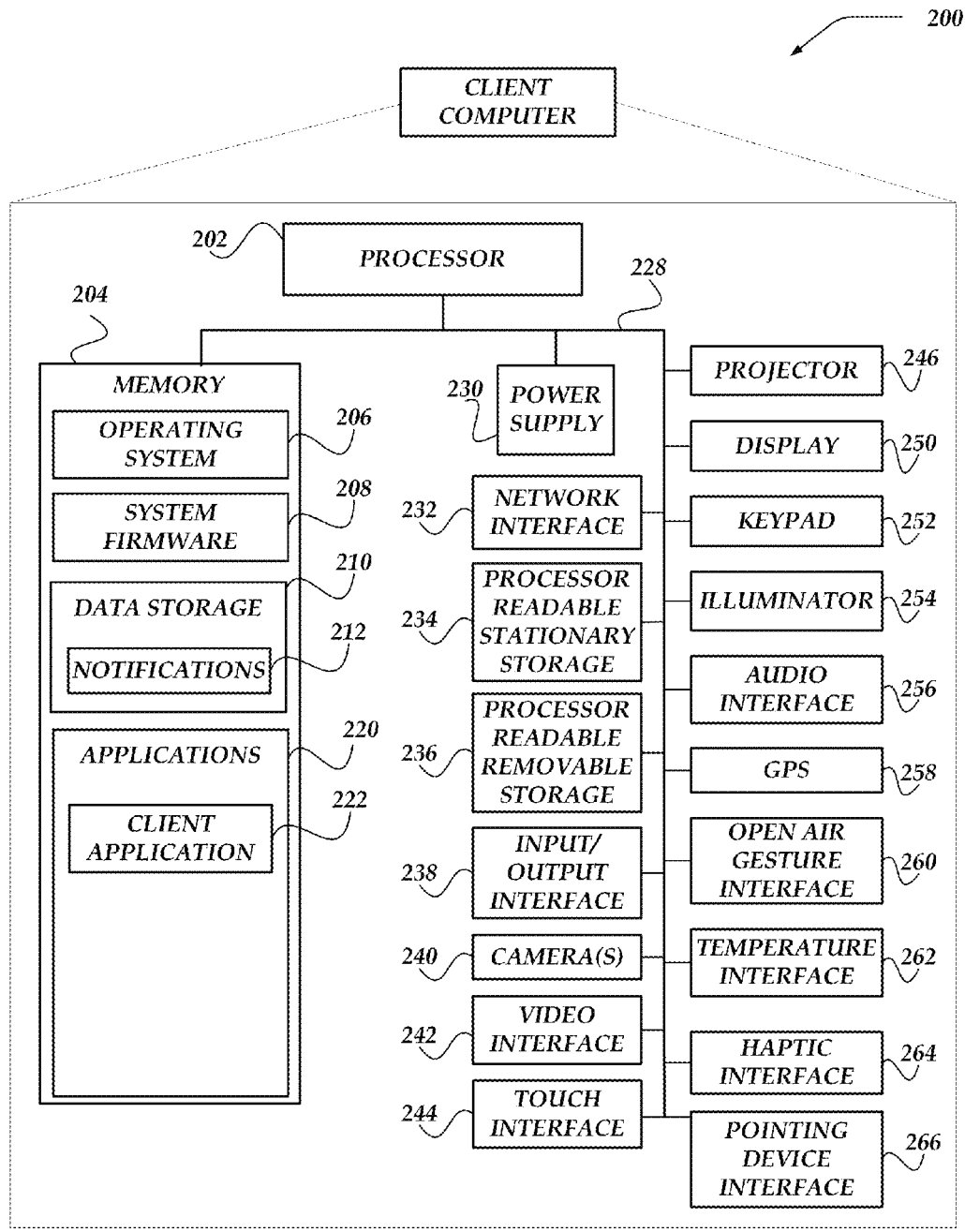
FIG. 2 shows an embodiment of a client computer that may be included in a system such as that shown in FIG. 1.

FIG. 2 shows one embodiment of client 200 that may include many more or less components than those shown. Client computer 200 may represent, for example, at least one embodiment of client computers 102-105 shown in FIG. 1. So, client computer 200 may be a mobile device (e.g., a smart phone or tablet), a stationary/desktop computer, or the like.

Client computer 200 may include processor 202 in communication with memory 204 via bus 228. Client computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Client computer 200 may optionally communicate with a base station (not shown), or directly with another computer. And in one embodiment, although not shown, an accelerometer or gyroscope may be employed within client computer 200 for measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, TDMA, UDP, TCP/IP, SMS, MMS, GPRS, WAP, UWB, WiMax, SIP/RTP, GPRS, EDGE, WCDMA, LTE, UMTS, OFDM, CDMA2000, Ev-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light-emitting diode (LED), Organic LED (OLED), or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Client computer 200 may also comprise input/output interface 238 for communicating with external peripheral devices or other computers such as other mobile computers and network computers. Input/output interface 238 may enable client computer 200 to communicate with one or more servers, such as pus notification server computer 110 and/or application server computer 112 of FIG. 1. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, client computer 200 may, through other components, provide other information that may be employed to determine a physical location of the mobile computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. In various embodiments, the browser application may be configured to enable a user to communicate with other users, such as through a chat session on a web page. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), Javascript Object Notation (JSON), HTML5, or the like.

Memory 204 may include RAM, ROM, and/or other types of memory. Memory 204 illustrates an example of computer-readable storage media (devices) for storage of information such as computer-readable instructions, data structures, program modules, or other data. Memory 204 may store system firmware 208 (e.g., BIOS, UEFI, or the like) for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, the Symbian® operating system, Apple's IOS or OSX, or the like. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile device.

Data storage 210 may also store notifications 212. Notifications 212 may include push notification messages and/or additional data provided by a push notification server computer and/or application server computer, or other client computers.

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Applications 220 may also include one or more client application 222. Client application 222 may be arranged to perform a variety of services including messaging communications, such as, email, SMS, IM, MMS, internet relay chat ("IRC"), Microsoft IRC ("mIRC"), Really Simple Syndication ("RSS") feeds, or the like. In some embodiments, client application 222 may be a client application that is configured to integrate and employ a variety of messaging protocols, including, but not limited to various push and/or pull mechanisms for client computer 200. In one embodiment, client application 222 may interact with a browser for managing and/or performing actions. Accordingly, in some embodiments, client computer 200 may be enabled to employ various embodiments, combinations of embodiments, processes, or parts of processes, as described herein.

Additionally, in one or more embodiments (not shown in the figures), client computers may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), a client computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may represent, for example push notification server computer 110 and/or application server computer of FIG. 1.

Network computer 300 may include processor 302, processor readable storage media 328, network interface unit 330, an input/output interface 332, hard disk drive 334, video display adapter 336, GPS 338, and memory 304, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard or other input or output devices not shown in FIG. 3. Input/output interface 332 can utilize one or more communication technologies, such as USB, infrared, Bluetooth™, or the like.

GPS transceiver 338 can determine the physical coordinates of network computer 300 on the surface of the Earth, which typically outputs a location as latitude and longitude values. GPS transceiver 338 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 338 can determine a physical location for network computer 300. In at least one embodiment, however, network computer 300 may, through other components, provide other information that may be employed to determine a physical location of the network computer, including for example, a Media Access Control (MAC) address, IP address, and the like.

Memory 304 generally includes RAM, ROM, and/or one or more permanent mass storage devices, such as hard disk drive 334, tape drive, optical drive, and/or floppy disk drive. Memory 304 stores operating system 308 for controlling the operation of network computer 300. Any general-purpose operating system may be employed. System firmware 306 is also provided for controlling the low-level operation of network computer 300 (e.g., BIOS, UEFI, or the like).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, applications 318 and/or other data. For example, data storage 310 may also be employed to store information that describes various capabilities of network computer 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of network computer 300, including, but not limited to processor-readable storage media 328, hard disk drive 334, or the like. Data storage 310 may include message archive 312.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

Applications 318 may include one or more server applications, such as, server application 320. In some embodiments, server application 320 may include virtually any computing component or components configured and arranged to communicate and/or provides services in association the one or more client applications, or the like. For example, server application 320 may be a messaging server may include a message transfer manager to communicate a message employing any of a variety of email protocols, including, but not limited to, Simple Mail Transfer Protocol ("SMTP"), Post Office Protocol ("POP"), Internet Message Access Protocol ("IMAP"), Network New Transfer Protocol ("NNTP"), or the like. Messaging server 320 may be configured to manage SMS messages, IM, MMS, IRC, RSS feeds, mIRC, or any of a variety of other message types. In one embodiment, server application 320 may enable users to initiate and/or otherwise conduct chat sessions, VOIP sessions, or the like.

Also, in at least one of the various embodiments, network computer 300 may include a push notification server application, such as, push notification server application 322, for performing actions related to the processing, generation, forwarding, and so on, of push notification message.

Additionally, in one or more embodiments (not shown in the figures), the network computer may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
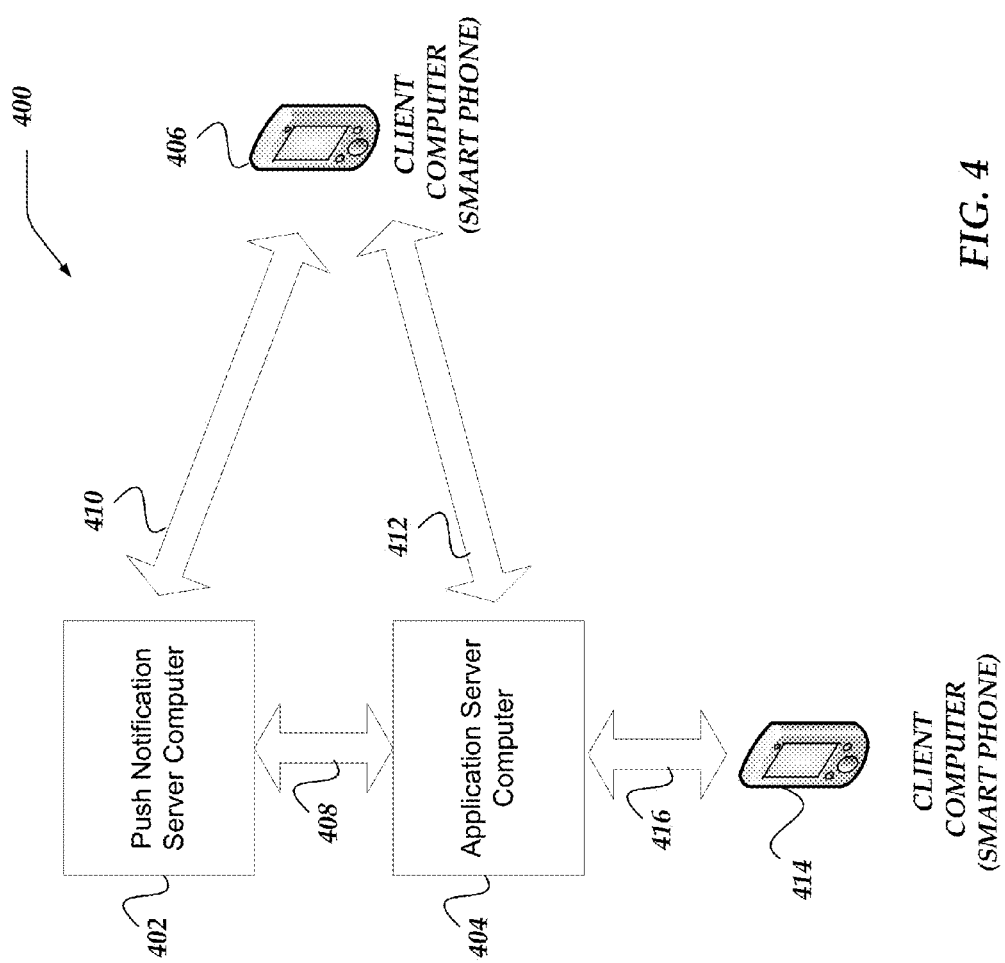
FIG. 4 illustrates a logical architecture of a system for enhanced push notification in accordance with at least one of the various embodiments.

FIG. 4 illustrates a logical architecture of system 400 for enhanced push notification in accordance with at least one of the various embodiments. In at least one of the various embodiments, system 400 may be arranged to include one or more push notification server computers, such as, push notification server computer 402. In some embodiments, push notification server computer 402 may be a network computer, such as, network computer 300.

In at least one of the various embodiments, system 400 may be arranged to include one or more application server computers, such as, application server computer 404. In some embodiments, application server computer 404 may be a network computer, such as, network computer 300.

In at least one of the various embodiments, system 400 may be arranged to include one or more client computers, such as, client computer 406 and client computer 414. In some embodiments, client computer 406 and client computer 414 may be client computers, such as, client computer 200.

In at least one of the various embodiments, application server computer 402, push notification server application 404, and client computer 406 may be communicatively coupled to via one or more networks, such as, network 408, network 410, and network 412. In some embodiments, these networks may be part of one or more networks such as network 108 shown FIG. 1. Likewise, in at least one of the various embodiments, client computer 414 may be communicatively coupled to application server computer 404 via network 416.

In at least one of the various embodiments, system 400 may be arranged to enables client applications on client computer 406 and client computer 414 to interact with an associated server applications that may be running on application server computer 404. For examples, the server application may be a messaging application that enables a user of client computer 414 to communicate message data to client computer 406 over on or more networks, such as, cellular, WiFi, or the like. For example, application server 404 may be arranged to enable a user of a client application on client computer 414 to share a photograph with a user of client computer 406. In this example, the user of client computer 414 may take a photograph with the client computer and communicate it the appropriate service application that is running on application server computer 404. Subsequently, the server application that is running on application server computer 404 may communicate the communicated photograph to client computer 406. The type of message data (e.g., images, audio, text, or the like) may depend the arrangement and/or capabilities of the particular client application, server applications, and so on, that are being used.

In at least one of the various embodiments, in some cases, a client application running a client computer may be unavailable to receive message data communications from the application server computer. For example, the target client computer may be offline or otherwise unreachable by the networks. In another example, the target client application may be running in the background and therefore unavailable to receive message data. Accordingly, in at least one of the various embodiments, application server 404 may provide a push notification message (PNM) to the push notification server computer.

In at least one of the various embodiments, the PNM may be associated with the source client application and source client computer using a key, token, tag, or the like, that corresponds to the target client application and target client computer. In at least one of the various embodiments, the necessary keys, tokens, or tags, for associating a PNM with its sender and target may be acquired during a registration/handshaking process. For example, upon initial startup, client applications may register with the push notification server computer to enable push notification messages to be communicated appropriately. The details of the registration process and the format of keys, tokens, or the like, may vary depending on the operating systems, the client computer, the vendor of the push notification platform (if one is used), or the like.

In at least one of the various embodiments, if a target client application is unavailable to receive message data from source client application, the push notification server computer may attempt to communicate a push notification message to the target client computer. If the target computer is reachable on a network, the push notification server computer may send a push notification message (PNM) that may be displayed on the target client computer.

In at least one of the various embodiments, the amount/size of the message data may exceed a message size or display size limit of the push notification system. For example, in at least one of the various embodiments, push notification messages may be arranged to be displayed in a dialog box that is displayed on the client computer. In some cases, the size of the dialog box may be restricted such that the entire message data may not be shown. Or in some cases, the message data may require features of the of the target client application to be rendered/displayed properly. Accordingly, the PNM may include summary data that shows the user the meaning of the PNM. Thus, a user may access the client application to view/interact with the entire message data.

In at least one of the various embodiments, the push notification server may provide the PSN and the entire message data to the client computer at the same time. Accordingly, if the user views that the target client application when the client computer is offline, the message data may be available for user by the client application.

In other embodiments, the push notification server computer may provide only the PNM absent the underlying message data. In such cases, if the user views the corresponding client application, the client application may request the message data from the application server computer. Accordingly, for such embodiments, if the target computer is offline when the client application is view/accessed it may be unable to request the message data even though a PNM was received earlier.

Likewise, in at least one of the various embodiments, even if the target client computer is online and ready to the request the message data associated with a PNM, the application server computer may be offline or otherwise unreachable over the network. Accordingly, the target client computer would again be prevented from retrieved the message data that may be associated with the PNM.

In at least one of the various embodiments, push notification server applications, server applications, and/or client applications may be arranged to support enhanced push notification that may be resistant to problems that may be associated with one or more computers going offline or being unavailable.

In at least one of the various embodiments, enhanced push notification may include providing the PNM and the message data to the target computer at the same time rather than waiting until the users accesses the PNM or the client application to fetch the message data from the application server computer. Thus, if the client computer is unable to communicate with the application server it may still view/interact with the message data associated with the PNM.

In at least one of the various embodiments, the application server may provide a PNM and the entire message data to the push notification server when it provided the PNM information. Accordingly, the push notification server may archive any message data that may not fit in the PNM. For example, a push notification platform may have a defined size limit for PNMs. Accordingly, in this example, if the message data size exceeds the size limit of the PNM, the message data may be archived at the push notification server. In contrast, if the entirety of the message data may be included in the PNM, the message data may simply be bundled with the PNM. Thus, if the client computer becomes available to receive the PNM, the push notification server may also send the message data without communicating with the application server computer.

In at least one of the various embodiments, the push notification server may be arranged to monitor whether PNM and/or its message data has been received by a target client computer. For example, in some embodiments, more than one messages may be attempted to be delivered to an offline target client computer. Accordingly, in some embodiments, if the target client computer rejoins the network, the push notification server may be enabled to provide all of the messages that are intended for the client computer. In this embodiments, the client computer may receive all of the undelivered messages in the order that they were received by the push notification server computer.

However, in at least one of the various embodiments, the push notification server may be arranged to just send the PNM that corresponds to the latest (newest) message data. Thus, when the user views the target client application in response to the PNM the messages (e.g., message data) for the previously undeliverable messages may be available to the target client application.

In at least one of the various embodiments, the push notification platform may be unable to communicate the message data directly to the target client computer because of transmission size limits built into the push notification platform. Accordingly, as much of the message data as allowed may be included in the PNM itself with tag or marker at the end that indicates that just a portion of the message data has been provided. For example, if a messaging client application is trying send a 4096 byte text message to a target computer and the push notification platform limits PNMs to 2048 bytes, the push notification server may include the first 2048 bytes of the message in the body of the PNM (less any header/overhead bytes that are required by the push notification protocol being used) and provide the PNM it the target computer.

In at least one of the various embodiments, managing communication over a network using a network computer may include: employing an application server to provide message data and notification information that correspond to a target client computer; if the target client computer may be available for communication on the network, performing further actions, including: providing a push notification message that may include the notification information and the message data; separately communicating the push notification message and the message data to the target client computer; and if the target client computer may be unavailable on the network, archiving the message data and notification information separate from the application server.

In at least one of the various embodiments, if a size of the message data may be below a threshold value the message data, embedded in the push notification message for communicating to the target client computer. In at least one of the various embodiments, if the push notification message may be received at the target client computer and communication may be available on the network, the message data may be downloaded to the target client computer.

In at least one of the various embodiments, archived message data and notification information may be communicated to the target client computer in order if communication is available with the target client computer.

In at least one of the various embodiments, if a size of the provided message data exceeds a size limit of the push notification message, the message data may be archived separate from the application server.

In at least one of the various embodiments, if a size of the message data exceeds a limit of the push notification message, a portion of the message data may be included in the push notification message, wherein a size of the portion stored is based on the limit.

In at least one of the various embodiments, if a size of the message data exceeds a limit based on a type of the network, the message data may be archived separate from the application server and communicating the push notification message to the target client computer; and if the target client computer may be available for communication on another type of network and the size of the message data may be less than another limit of the other type of network, the message data may be separately communicated to the target client computer.

In at least one of the various embodiments, if a size of the message data exceeds a user selectable limit for a type of the network, the message data may be archived separate from the application server and communicating the push notification message to the target client computer.

Generalized Operations

The operation of certain aspects of the invention will now be described with respect to FIGS. 5-8. In at least one of various embodiments, processes 500, 600, 700, or 800 of FIGS. 5-8, respectively, may be implemented by and/or executed on a combination of computers, such as client computer 200 of FIG. 2 and/or network computer 300 of FIG. 3. Additionally, various embodiments described herein can be implemented in a system such as system 100 of FIG. 1. It should be noted that various embodiments described herein may be employed as part of a client application, such as, a messaging application, an API to a messaging application, a plug-in for a browser or messaging application, an image sharing application, an API of an image sharing application, a plug-in for a browser or image sharing application, or the like. Additionally, the client application may include other applications that have messaging features or functionality that employ push notifications, such as, for example, games, navigation applications, or the like.

Figure 5:
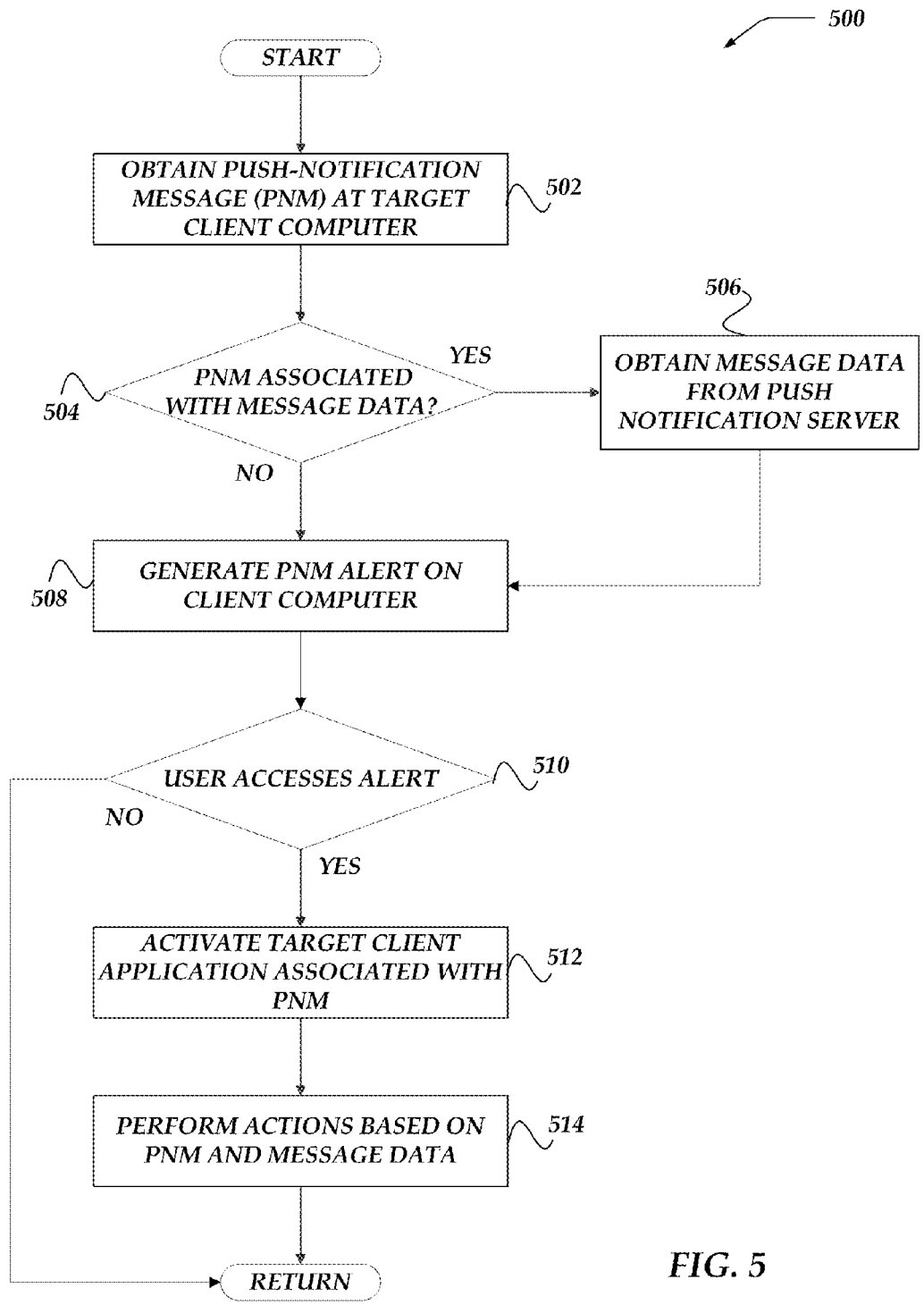
FIG. 5 illustrates a logical flow diagram for a process generally showing one embodiment of an overview process for enhance push notifications in accordance with at least one of the various embodiments.

FIG. 5 illustrates a logical flow diagram for process 500 generally showing one embodiment of an overview process for enhance push notifications in accordance with at least one of the various embodiments. After a start block, at block 502, in at least one of the various embodiments, one or more push notification messages (PNMs) may be obtained from a push notification server.

In at least one of the various embodiments, client computer may be registered with a push notification server and/or push notification platform. Accordingly, in at least one of the various embodiments, if a push notification server has a PNM for a client application that may be on a client computer it may communicate the PNM to the client computer over a network.

In some embodiments, if the client computer has been offline and then returns to the network, the push notification server may provide PNMs that are associated with events that occurred while the client computer was offline.

At decision block 504, in at least one of the various embodiments, if there is additional message data associated with the PNM, control may flow to block 506; otherwise, control may flow to block 508. In at least one of the various embodiments, PNM may be associated with addition message data that may not be included in the PNM itself. For example, some push notification platforms have a size limit for PNMs, such as, 2096 bytes. In such cases, in at least one of the various embodiments, the PNM may include information for identify and/or referencing the additional message data that may be associated with the PNM.

Alternatively, in at least one of the various embodiments, the message data may be included in the PNM itself rather than stored separately. Additional message data that does not cause the PNM to exceed a size limit (if any) may be included as part of the PNM itself rather than being held separate from the PNM.

At block 506, in at least one of the various embodiments, since there is additional message data that is separate from the PNM, the client application may communicate a request to the push notification server to obtain the additional message data associated with the PNM from.

At block 508, in at least one of the various embodiments, an alert associated with the PNM may be generated and displayed on the client computer. In at least one of the various embodiments, the target application may be unavailable to receive the message. For example, the target application may not be the foreground application of an Apple IOS device. Thus, in this example, the target application may be prevented from received the message directly.

In at least one of the various embodiments, the form of the alert may vary depending on the capabilities of the client computer and the user's configuration settings. In at least one of the various embodiments, various forms of alerts may include, lock screen popup dialog boxes, banner across the top or bottom of the client computer display, vibrations, sounds, screen flashes, or the like, or combination thereof.

At decision block 510, in at least one of the various embodiments, if the user accesses the alert, control may flow to block 512; otherwise, control may be returned to a process to enable to the client computer to perform other actions. As described above, there may be various type of alerts depending on the client computer and its user's configuration. Accordingly, there may be various ways for a user to access (e.g., interact) with an alert. For example, in at least one of the various embodiments: alerts present user-interfaces that have buttons that can be pushed; alerts may be swipe-able on client computers that have touch screen interfaces; alerts may be interactive with voice commands; and so on. In at least one of the various embodiments, alerts may be stored in a central notification application that may be accessed later by a user. Accordingly, users may be enabled to dismiss the alert and then access the PNM later using another client application for managing notifications and PNMs.

At block 512, in at least one of the various embodiments, the target client application that may be associated with the PNM may be activated. In at least one of the various embodiments, PNM may be associated with information that enables the client computer operating system to determine the client application that may be associated with PNM. Accordingly, the target client application may be activated and/or launched so it can respond to the PNM.

At block 514, in at least one of the various embodiments, the client computer may perform one or more actions based on the PNM and/or its associated message data. For example, the target client application may be a messaging application, thus the text, images, or audio, included in the message data may be displayed or played. Next, control may be returned to a calling process.

Figure 6:
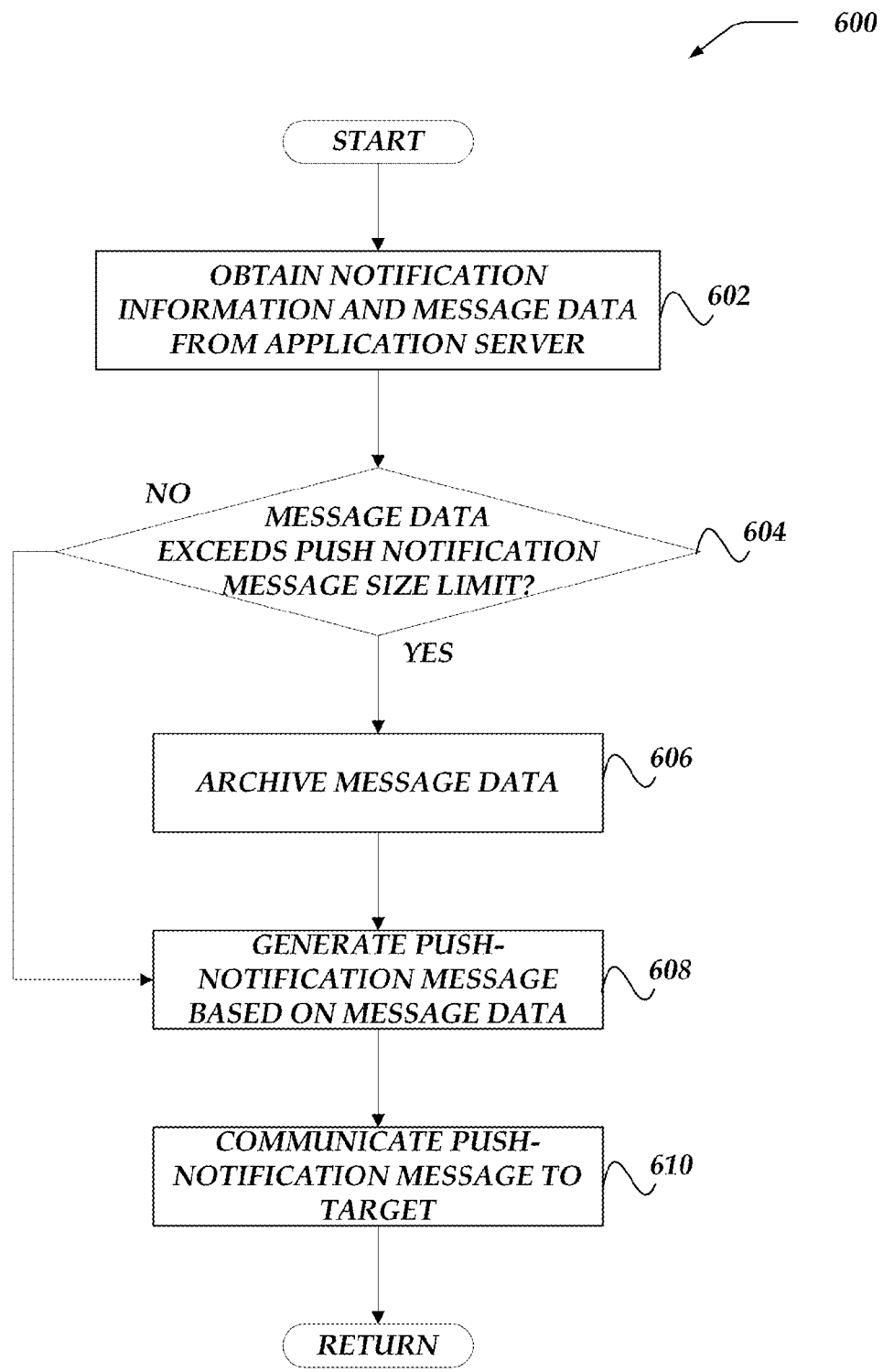
FIG. 6 illustrates a logical flow diagram for a process for a push notification server to provide data to a client compute in accordance with at least one of the various embodiments.

FIG. 6 illustrates a logical flow diagram for process 600 for a push notification server to provide data to a client compute in accordance with at least one of the various embodiments. After a start block, at block 602, in at least one of the various embodiments, notification information and message data may be obtained from an application server.

In at least one of the various embodiments, various application servers may be arranged to communicate messages/data to one or more client computers. For example, an application server may be part of messaging service that may be arranged to exchange messages from one client computer to another client computer. Accordingly, in this example, the application server may employ one or more well-known techniques to communicate messages between participating client computers. However, in some cases, the application server may determine that a target client computer may be offline or the target client application may be inactive. In such cases, in at least one of the various embodiments, the application server may request that push notification message (PNM) be sent to the target client computer. Accordingly, in at least one of the various embodiments, the application server may communicate information for a PNM and the message data was undelivered to the target client computer to a push notification server.

In at least one of the various embodiments, the particular push notification server may be determined based on configuration information that defines one or more push notification servers for the client application. For example, an application server may registered with one or more push notification servers. In some embodiments, the application server may register using information provided by the client application that running on a particular client computer. This registration information enables the push notification server to route PNMs to the correct client computer.

At decision block 604, in at least one of the various embodiments, if the amount of message data exceeds a defined push notification message size limit, control may flow to block 606; otherwise, control may flow to block 608.

At block 606, in at least one of the various embodiments, the message data may be archived on the push notification server. In some embodiments, if the message data that the application server is trying to communicate to the client computer cannot fit within a PNM, the push notification server may store the message data in an archive so it may be retrieved later. The archived message data may be associated with the registration data of the client application and the PNM to enable it to be identified and/or retrieved.

At block 608, in at least one of the various embodiments, the push notification server may generate a push notification message based on the notification information and/or the message data provided by the application server. In at least one of the various embodiments, the push notification server may generate PNM accordingly to a defined message format protocol. The PNM may include the meta-data necessary for a push notification platform to deliver the PNM. For example, the PNM may include registration information of the target client computer/application, summary/subject information, tags, message body data, user-interface format data, custom fields, or the like, or combination thereof. In at least one of the various embodiments, if the message data may be included in the PNM is may be added as well. For example, in some embodiments, some or all of the message data may be added to custom fields in PNM.

One of ordinary skill in the art will appreciate how to arrange to a push notification server to generate PNMs that conform to a provided/defined format and/or protocol. For example, in some embodiments, the PNM may be generated using XML, JSON, fixed length field files, csv files, or the like.

At block 610, in at least one of the various embodiments, the push notification message may be communicated to a target client computer. In at least one of the various embodiments, the push notification server may provide the PNM to central push notification platform that may communicate the PNM to the target client computer. In other embodiments, the push notification server may be arranged to communicate the PNM directly to the target client computer over a network. Next, control may be returned to a calling process.

In at least one of the various embodiments, a client computer that is the target client computer for a message may be determined based on the notification information and the message data that may be provided by the application server.

Figure 7:
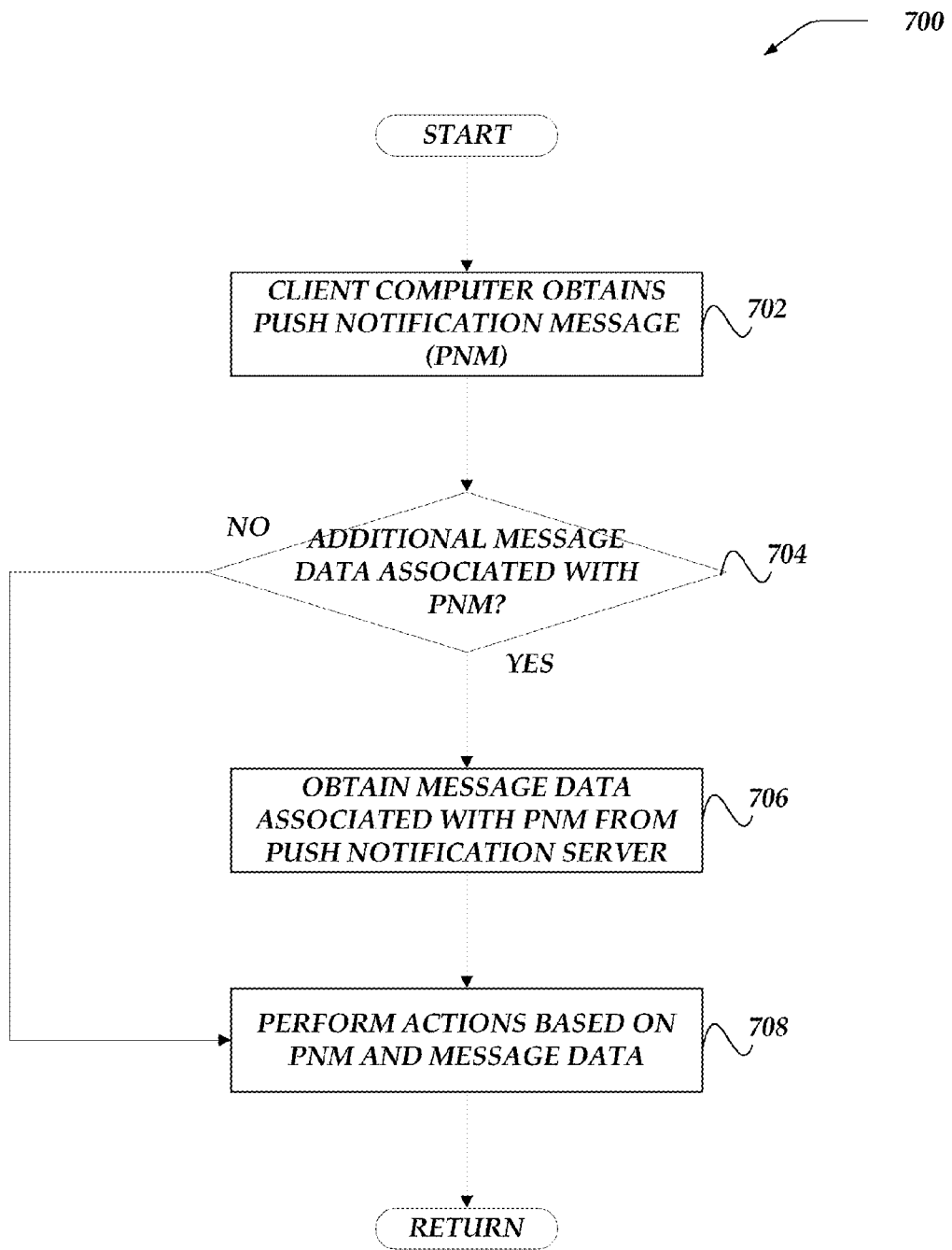
FIG. 7 illustrates a logical flow diagram for a process for a client computer that receives push notification message associated with archived data, in accordance with at least one of the various embodiments.

FIG. 7 illustrates a logical flow diagram for process 700 for a client computer that receives push notification message associated with archived data, in accordance with at least one of the various embodiments. After a start block, at block 702, in at least one of the various embodiments, a client computer may obtain a push notification message (PNM) from a push notification server. In at least one of the various embodiments, the client computer may be provided the PNM directly by the push notification server. Or, in some embodiments, the PNM may be provided to the client computer by a push notification platform that obtained the PNM from the push notification server.

At decision block 704, in at least one of the various embodiments, if there is additional message data associated with the PNM, control may flow to block 706; otherwise, control may flow to block 708. In at least one of the various embodiments, if the PNM is associated with additional message data, the PNM may include meta-data that may indicate to the client computer that there is additional message data separate from the PNM.

At block 706, in at least one of the various embodiments, message data that may be associated with the PNM may be obtained from the push notification server. In at least one of the various embodiments, the client computer and/or the client application may generate a network communication that requests the message data from the push notification server.

In at least one of the various embodiments, since the push notification server has archived the message data, separate from the application server, the message data and/or associated notification information may be obtained by the target client computer even if the application server that provided the message data may be unavailable or otherwise unreachable.

Accordingly, the application server may have uploaded to the message data to the push notification server while the target client computer and/or the client application was unavailable. Likewise, upon receiving the associated PNM, the client computer may obtain the message data while the application server may be offline or otherwise unavailable.

In at least one of the various embodiments, push notification server applications, target client computer, and/or client applications may be arranged to support one or more configuration values, such as limits or threshold that may be used to determine if message data should be provided to a target client computer.

In at least one of the various embodiments, different networks may have message size limits associated with them. The push notification server may use size limits to determine if the message data should be delivered or archived. In some embodiments, since different networks may have different capabilities and/or costs, it may not be advantageous to deliver the message data in every case.

Accordingly, in at least one of the various embodiments, if the size of the message data exceeds a limit associated with a particular type of a network, the message data may be archived separate from the application server rather than delivering to the target client computer. However, the push notification message may be delivered to the target client computer. For example, message size limit of 0 bytes may be set if the target client computer is coupled to a "roaming cellular network. Likewise, for this example, a 4096 bytes limit may be set for communication over a normal (non-roaming) cellular network, while, a size limit of 10 Mbyte may set if the target client computer may be coupled to a WiFi network. Thus, in at least one of the various embodiments, the push notification server application may be arranged to dynamically enforce a size message size limit based on the type of network used to communicate with the target client computer.

Also, in at least one of the various embodiments, if a target client computer joins another network (e.g., the network changes from cellular to WiFi), archived messages that have a size less than the size of limit the new joined network may be communicated to the target client computer.

In at least one of the various embodiments, push notification server applications and/or client applications may be arranged to have one or more limits set for types of networks, types of message data (e.g., text, audio, image, video, and so on), time of day, amount of data sent over a time period (e.g., hourly, daily, monthly, billing cycle, time periods). Also, in some embodiments, limits may be based on the size of the message data, the age of message data, the source/destination of the message data. Further, in at least one of the various embodiments, limits may be user selectable settings or in some embodiments, system-wide settings.

At block 708, in at least one of the various embodiments, one or more actions may be performed on the client computer based on the PNM and the obtained additional message data. As described before, the particular actions that may be performed depend on the particular client application, application server, and the type and content of the PNM and additional message data (if any). For example, a client application for an image sharing service the additional message data may be an image sent from another client computer. Accordingly, in this example, the client application on the target client computer may display the image. Likewise, text based messaging application may display text messages, and so on. Next, control may be returned to a calling process.

Figure 8:
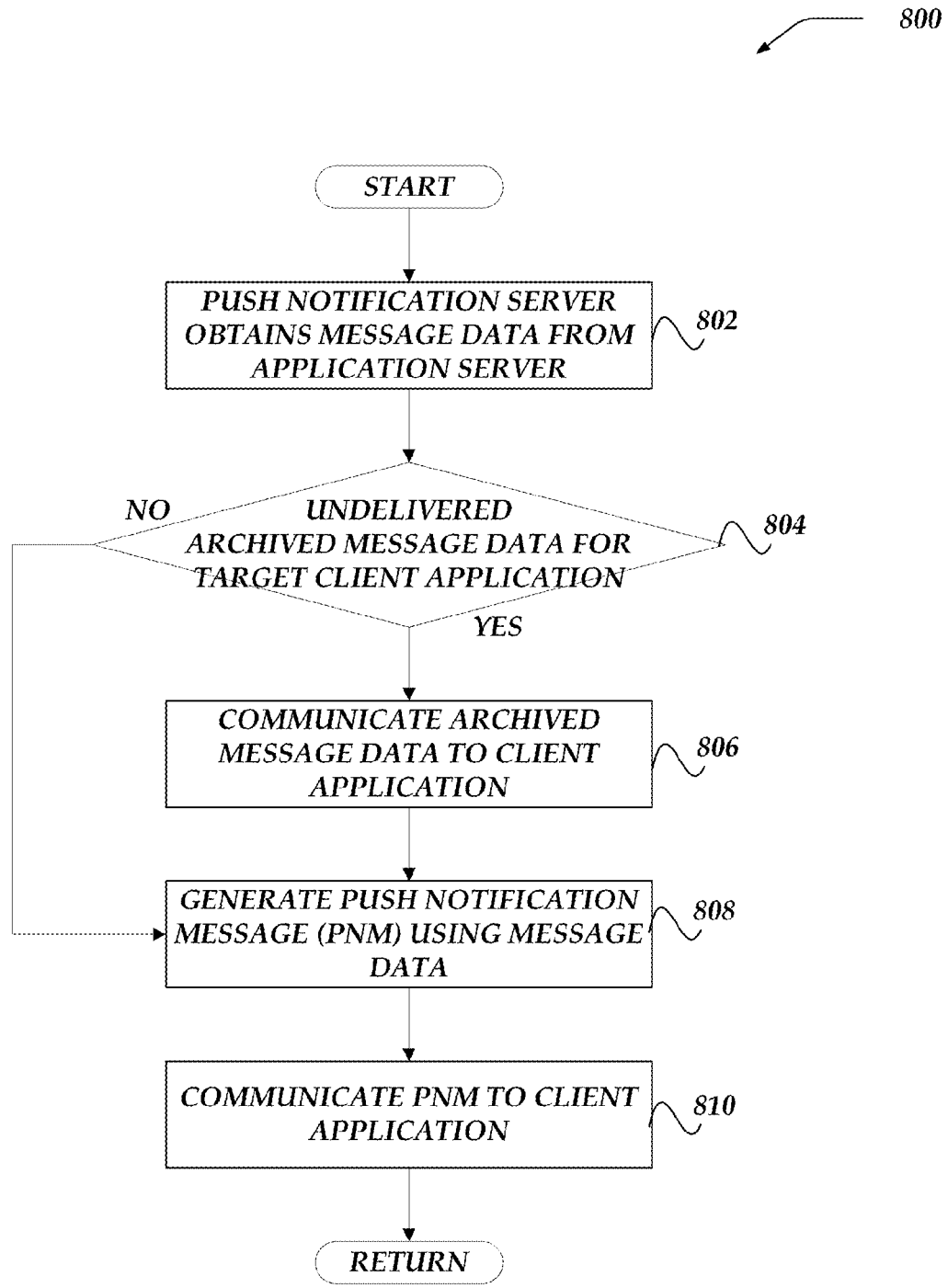
FIG. 8 illustrates a logical flow diagram for a process for handling push notifications where multiple messages may be undelivered, in accordance with at least one of the various embodiments.

FIG. 8 illustrates a logical flow diagram for process 800 for handling push notifications where multiple messages may be undelivered, in accordance with at least one of the various embodiments. After a start block, at block 802, in at least one of the various embodiments, a push notification server may obtain message data from an application server. As described above, application servers may provide notification information and additional message data associated with communications that may be undeliverable to a target client computer and/or target client application.

At decision block 804, in at least one of the various embodiments, if there are undelivered archived messages for the target client computer, control may flow to block 806; otherwise, control may flow to block 808. In at least one of the various embodiments, the push notification server may scan a message archive to determine if there are undelivered archived messages for the target client application. For example, in some embodiments, an application server may have tried to send several messages while the client application and/or the client computer were unavailable or otherwise offline.

At block 806, in at least one of the various embodiments, one or more archived messages may be communicated in an order to the target client computer. In at least one of the various embodiments, the previously undelivered message data may be provided to the target client application in the order they were archived. For example, the oldest archived message may be provided first, next the second oldest may be provided, and so on. Note, in some embodiments, these previously undelivered messages may be provided without a corresponding push notification message (PNM). In at least one of the various embodiments, notification information that may be associated with the archived messages may also be communicated to the target client computers.

In at least one of the various embodiments, the order the message data may be communicated may be based, one or more of, time delivered to push notification server, time sent by source client computer, size of message data, type of message data, sender, source, the of network, arrangement of the client application and application server, or the like, or combination thereof. For example, for some applications the ordering may be set to send to the smallest messages first, this would result in the greatest number of messages to be delivered in the shortest time. Other applications may be arranged to send the newest message first since (depending on the application) the newest messages may be considered to be the most important. At block 808, in at least one of the various embodiments, a PNM may be generated using the message data. The PNM may be generated as described above, from the most recent message data and notification information that may be provided by the application server.

At block 810, in at least one of the various embodiments, the PNM may be communicated to the client computer. As described, one or more networks may be used to communicate the PNM to the client computer. Next, control may be returned to a calling process.

Figure 9:
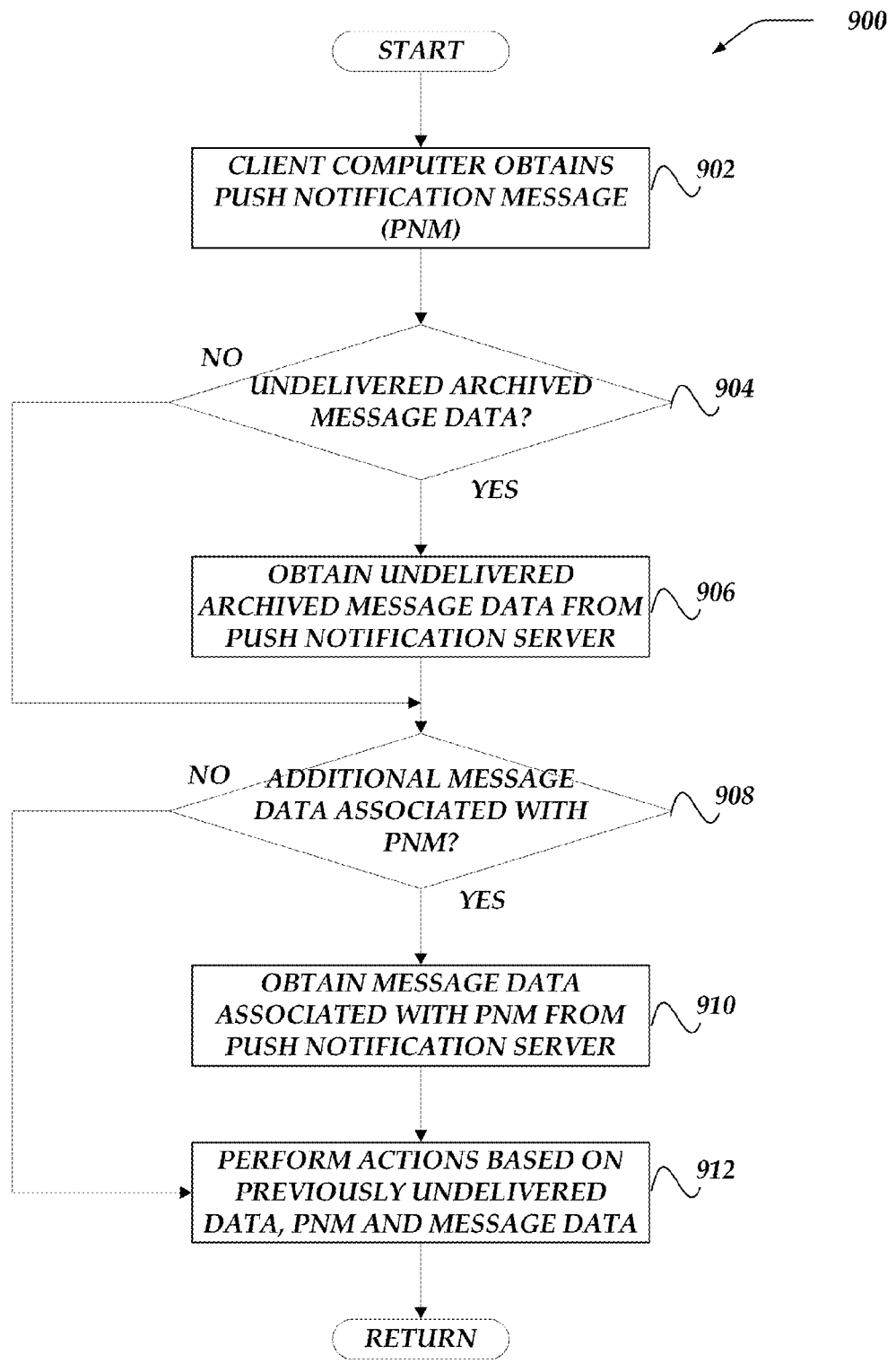
FIG. 9 illustrates a logical flow diagram for a process for handling push notifications where multiple messages may be undelivered, in accordance with at least one of the various embodiments.

FIG. 9 illustrates a logical flow diagram for process 900 for handling push notifications where multiple messages may be undelivered, in accordance with at least one of the various embodiments. In at least one of the various embodiments, process 900 is similar to process 700, except it may be arranged to handle the situation where there are one or more undelivered archived messages on the push notification server.

After a start block, at block 902, in at least one of the various embodiments, a client computer may obtain a push notification message (PNM) from a push notification server. In at least one of the various embodiments, the client computer may be provided the PNM directly by the push notification server. Or, in some embodiments, the PNM may be provided to the client computer by a push notification platform that obtained the PNM from the push notification server.

At decision block 904, in at least one of the various embodiments, if there are undelivered archived message data for the target client application on the push notification server, control may flow to block 906; otherwise, control may flow to decision block 908. In at least one of the various embodiments, the PNM may include meta-data that may indicate if there may be one or more undelivered archived messages on the push notification server.

At block 906, in at least one of the various embodiments, the one or more undelivered archived message data may be obtained from the push notification server. In at least one of the various embodiments, the undelivered message data may be provided in the same order it may have been delivered to the push notification server. In some embodiments, one or more of the previously undelivered message data may be bundled into a single communication from the push notification server.

Accordingly, the client application may process the previously undelivered message data as in the same order it was received at the push notification server to preserve the order of delivery from the source client computers.

Also, in at least one of the various embodiments, since the push notification server has archived the undelivered message data, the undelivered message data may be obtained by the target client application and/or target client computer even if the application server that provided the undelivered message data may be unavailable or otherwise unreachable.

At decision block 908, in at least one of the various embodiments, if there is additional message data associated with the PNM, control may flow to block 910; otherwise, control may flow to block 912. In at least one of the various embodiments, if the PNM is associated with additional message data, the PNM may include meta-data that may indicate to the client computer that there is additional message data separate from the PNM.

At block 910, in at least one of the various embodiments, message data that may be associated with the PNM may be obtained from the push notification server. In at least one of the various embodiments, the client computer and/or the client application may generate a network communication that requests the additional message data from the push notification server.

In at least one of the various embodiments, since the push notification server has archived the additional message data, the additional message data may be obtained even if the application server that provided the message data may be unavailable or otherwise unreachable.

Accordingly, the application server may have uploaded to the message data to the push notification server while the target client computer and/or the client application was unavailable. Likewise, upon receiving the associated PNM, the client computer may obtain the message data while the application server may be offline or otherwise unavailable.

At block 912, in at least one of the various embodiments, one or more actions may be performed on the client computer based on the previously undelivered messages, the PNM, and the obtained additional message data. As described before, the particular actions that may be performed depend on the particular client application, application server, and the type and content of the PNM and additional message data (if any). For example, a client application for an image sharing service the additional message data may be an image sent from another client computer. Accordingly, in this example, the client application on the target client computer may display the image. Likewise, text based messaging application may display text messages, and so on. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing communication over a network using a network computer to perform actions, comprising:
    employing an application server to provide message data and notification information that correspond to a target client computer;
    when the target client computer is available for communication on the network, performing further actions, including:
        providing a push notification message that includes the notification information and the message data;
        separately communicating the push notification message and the message data to the target client computer;
        when displaying the message data at the target computer requires a target client computer application and a size of the message data is above a threshold value, providing a summary of the message data to the target client computer, wherein the summary is displayed to a user in an alphanumeric character format that represents the meaning of the message data; and
        when the size of the message data is below the threshold value, embedding the message data in the push notification message for communicating to the target client computer; and
    when the target client computer is unavailable on the network, archiving the message data and notification information separate from the application server.

2. The method of claim 1, further comprising, when the push notification message is received at the target client computer and communication is available on the network, downloading the message data to the target client computer.

3. The method of claim 1, further comprising, communicating a plurality of archived message data and notification information to the target client computer in a same order that the plurality of archived message data and notification information is provided to the application server when communication is available with the target client computer.

4. The method of claim 1, further comprising, when the size of the provided message data exceeds a size limit of the push notification message, archiving the message data separate from the application server.

5. The method of claim 1, further comprising, when the size of the message data exceeds a limit of the push notification message, including a portion of the message data in the push notification message, wherein a size of the portion stored is based on the limit.

6. The method of claim 1, further comprising:
    when the size of the message data exceeds a limit based on a type of the network, archiving the message data separate from the application server and communicating the push notification message to the target client computer; and
    when the target client computer is available for communication on another type of network and the size of the message data is less than another limit of the other type of network, separately communicating the message data to the target client computer.

7. The method of claim 1, further comprising, when the size of the message data exceeds a user selectable limit for the type of the network, archiving the message data separate from the application server and communicating the push notification message to the target client computer.

8. A system for managing communication over a network, comprising:
    a network computer, comprising:
        a transceiver that communicates over the network;
        a memory that stores at least instructions; and a processor device that executes instructions that perform actions, including:
employing an application server to provide message data and notification information that correspond to a target client computer;
when the target client computer is available for communication on the network, performing further actions, including:
providing a push notification message that includes the notification information and the message data;
separately communicating the push notification message and the message data to the target client computer;
when displaying the message data at the target computer requires a target client computer application and a size of the message data is above a threshold value, providing a summary of the message data to the target client computer, wherein the summary is displayed to a user in an alphanumeric character format that represents the meaning of the message data; and
when the size of the message data is below the threshold value, embedding the message data in the push notification message for communicating to the target client computer; and
when the target client computer is unavailable on the network, archiving the message data and notification information separate from the application server; and
the target client computer, comprising:
a transceiver that communicates over the network;
a memory that stores at least instructions; and
a processor device that executes instructions that perform actions, including:
employing the transceiver to provide the message data and the notification information to the application server.

9. The system of claim 8, wherein the target client computer processor device executes instructions that perform actions, further comprising, when the push notification message is received at the target client computer and communication is available on the network, downloading the message data to the target client computer.

10. The system of claim 8, wherein the network computer processor device executes instructions that perform actions, further comprising, communicating a plurality of archived message data and notification information to the target client computer in a same order that the plurality of archived message data and notification information is provided to the application server when communication is available with the target client computer.

11. The system of claim 8, wherein the network computer processor device executes instructions that perform actions, further comprising, when size of the provided message data exceeds a size limit of the push notification message, archiving the message data separate from the application server.

12. The system of claim 8, wherein the network computer processor device executes instructions that perform actions, further comprising, when the size of the message data exceeds a limit of the push notification message, including a portion of the message data in the push notification message, wherein a size of the portion stored is based on the limit.

13. The system of claim 8, wherein the network computer processor device executes instructions that perform actions, further comprising:
when the size of the message data exceeds a limit based on a type of the network, archiving the message data separate from the application server and communicating the push notification message to the target client computer; and
when the target client computer is available for communication on another type of network and the size of the message data is less than another limit of the other type of network, separately communicating the message data to the target client computer.

14. The system of claim 8, wherein the network computer processor device executes instructions that perform actions, further comprising, when the size of the message data exceeds a user selectable limit for the type of the network, archiving the message data separate from the application server and communicating the push notification message to the target client computer.

15. A processor readable non-transitory storage media that includes instructions for managing communication over a network, wherein execution of the instructions by a hardware processor performs actions, comprising:
employing an application server to provide message data and notification information that correspond to a target client computer;
when the target client computer is available for communication on the network, performing further actions, including:
providing a push notification message that includes the notification information and the message data;
separately communicating the push notification message and the message data to the target client computer;
when displaying the message data at the target computer requires a target client computer application and a size of the message data is above a threshold value, providing a summary of the message data to the target client computer, wherein the summary is displayed to a user in an alphanumeric character format that represents the meaning of the message data; and
when the size of the message data is below the threshold value, embedding the message data in the push notification message for communicating to the target client computer; and
when the target client computer is unavailable on the network, archiving the message data and notification information separate from the application server.

16. The media of claim 15, further comprising, when the push notification message is received at the target client computer and communication is available on the network, downloading the message data to the target client computer.

17. The media of claim 15, further comprising, communicating a plurality of archived message data and notification information to the target client computer in a same order that the plurality of archived message data and notification information is provided to the application server when communication is available with the target client computer.

18. The media of claim 15, further comprising, when the size of the provided message data exceeds a size limit of the push notification message, archiving the message data separate from the application server.

19. The media of claim 15, further comprising, when the size of the message data exceeds a limit of the push notification message, including a portion of the message data in the push notification message, wherein a size of the portion stored is based on the limit.

20. The media of claim 15, further comprising:
when the size of the message data exceeds a user selected limit based on the type of the network, archiving the message data separate from the application server and communicating the push notification message to the target client computer; and
when the target client computer is available for communication on another type of network and the size of the message data is less than another limit of the other type of network, separately communicating the message data to the target client computer.

21. A network computer for managing communication over a network, comprising:
a transceiver that communicates over the network;
a memory that stores at least instructions; and
a processor device that executes instructions that perform actions, including:
employing an application server to provide message data and notification information that correspond to a target client computer;
when the target client computer is available for communication on the network, performing further actions, including:
providing a push notification message that includes the notification information and the message data;
separately communicating the push notification message and the message data to the target client computer;
when displaying the message data at the target computer requires a target client computer application and a size of the message data is above a threshold value, providing a summary of the message data to the target client computer, wherein the summary is displayed to a user in an alphanumeric character format that represents the meaning of the message data; and
when the size of the message data is below the threshold value, embedding the message data in the push notification message for communicating to the target client computer; and
when the target client computer is unavailable on the network, archiving the message data and notification information separate from the application server.

22. The network computer of claim 21, further comprising, when the push notification message is received at the target client computer and communication is available on the network, downloading the message data to the target client computer.

23. The network computer of claim 21, wherein the processor device executes instructions that perform actions, further comprising, communicating a plurality of archived message data and notification information to the target client computer in a same order that the plurality of archived message data and notification information is provided to the application server when communication is available with the target client computer.

24. The network computer of claim 21, wherein the processor device executes instructions that perform actions, further comprising, further comprising when the size of the provided message data exceeds a size limit of the push notification message, archiving the message data separate from the application server.

25. The network computer of claim 21, wherein the processor device executes instructions that perform actions, further comprising, further comprising when the size of the message data exceeds a limit of the push notification message, including a portion of the message data in the push notification message, wherein a size of the portion stored is based on the limit.

26. The network computer of claim 21, wherein the processor device executes instructions that perform actions, further comprising, further comprising:
when the size of the message data exceeds a user selected limit based on the type of the network, archiving the message data separate from the application server and communicating the push notification message to the target client computer; and
when the target client computer is available for communication on another type of network and the size of the message data is less than another limit of the other type of network, separately communicating the message data to the target client computer.

* * * * *